United States Patent
Nelson et al.

(10) Patent No.: US 11,001,146 B2
(45) Date of Patent: May 11, 2021

(54) MACHINE CONSOLE SYSTEM

(71) Applicant: Caterpillar Paving Products Inc., Brooklyn Park, MN (US)

(72) Inventors: Ryan J. Nelson, Maple Grove, MN (US); Bradley D. Anderson, Rogers, MN (US); Valerio E. D'Ascanio, Granarolo dell'Emilia (IT)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 77 days.

(21) Appl. No.: 16/376,746

(22) Filed: Apr. 5, 2019

(65) Prior Publication Data
US 2020/0317056 A1    Oct. 8, 2020

(51) Int. Cl.
*B60K 37/06*    (2006.01)
*B62D 1/18*    (2006.01)
*F16C 29/04*    (2006.01)
*E02F 3/04*    (2006.01)
*E01C 19/48*    (2006.01)

(52) U.S. Cl.
CPC ............... *B60K 37/06* (2013.01); *B62D 1/18* (2013.01); *F16C 29/045* (2013.01); *B60K 2370/685* (2019.05); *E01C 19/48* (2013.01); *E01C 2301/30* (2013.01); *E02F 3/04* (2013.01)

(58) Field of Classification Search
CPC . B60K 37/06; B60K 2370/685; F16C 29/045; B62D 1/18; E01C 19/48; E01C 2301/30; E02F 3/04
See application file for complete search history.

(56) References Cited

U.S. PATENT DOCUMENTS

| 2,912,714 | A | * | 11/1959 | Rich | .................... E05D 15/0669 |
|---|---|---|---|---|---|
| | | | | | 16/100 |
| 5,036,942 | A | * | 8/1991 | Loewen | ............. B62D 49/0692 |
| | | | | | 180/329 |
| 5,632,353 | A | * | 5/1997 | Kimberley | ............. B60K 35/00 |
| | | | | | 180/326 |
| 5,735,214 | A | * | 4/1998 | Tsuboi | .................. F16C 29/005 |
| | | | | | 104/106 |
| 6,446,747 | B1 | | 9/2002 | Müller et al. | |
| 6,450,687 | B1 | * | 9/2002 | Schroeder | ............. F16C 29/005 |
| | | | | | 384/50 |

(Continued)

FOREIGN PATENT DOCUMENTS

CN    202543773 U    11/2012
CN    202577101 U    12/2012
(Continued)

*Primary Examiner* — Darlene P Condra
(74) *Attorney, Agent, or Firm* — Bookoff McAndrews (57) ABSTRACT

A steering console system for a machine includes a longitudinally-extending rail configured to be fastened to a surface of the machine, the rail including a pair of convex-shaped edges, a steering console, and a console carriage slidably connected to the rail, the console carriage including a bracket, a plurality of rollers connected to the bracket, a support arm connected to the bracket to support the steering console, and a vertical pivot connected to the bracket and to the support arm. Each of the rollers has a concave groove configured to roll along the convex shaped edges, and each of the rollers is configured to rotate about an axis of rotation extending approximately normal with respect to the rail.

20 Claims, 6 Drawing Sheets

(56) References Cited

U.S. PATENT DOCUMENTS

| | | | |
|---|---|---|---|
| 8,776,941 B2 | 7/2014 | Herzberg | |
| 9,156,498 B2 | 10/2015 | Herzberg | |
| 2006/0131088 A1* | 6/2006 | Pawusch | B60K 35/00 180/90 |
| 2009/0268993 A1* | 10/2009 | Tsai | F16C 29/045 384/7 |
| 2010/0129013 A1* | 5/2010 | Schroeder | F16C 29/005 384/45 |
| 2013/0270866 A1* | 10/2013 | Herzberg | F16C 29/005 296/190.08 |
| 2017/0144544 A1* | 5/2017 | Fujita | G09G 3/36 |
| 2019/0186089 A1* | 6/2019 | Barimani | B60R 7/06 |
| 2019/0366818 A1* | 12/2019 | Pluciennik | B60J 7/043 |
| 2019/0367072 A1* | 12/2019 | Hansen | B62D 1/183 |

FOREIGN PATENT DOCUMENTS

| | | |
|---|---|---|
| CN | 103031797 B | 2/2016 |
| CN | 105178142 B | 10/2017 |
| EP | 3150766 A1 | 4/2017 |
| FR | 2812602 A1 | 2/2002 |

* cited by examiner

MACHINE CONSOLE SYSTEM

TECHNICAL FIELD

The present disclosure relates generally to a machine, and more particularly, to a machine console system.

BACKGROUND

Machines used for earth moving, paving, and other tasks may include consoles to control one or more operations performed by the machine. For example, a console for a machine may include a control device such as a steering wheel or joystick that allows an operator to maneuver the machine. Consoles may include additional control devices the enable operation of one or more implements or aspects of the machine. During the operation of the machine, it may be beneficial for an operator to have a clear line of sight of a side surface of the machine, for maneuvering the machine and/or monitoring the operation of the machine. For example, in machines used for paving operations, an operator may view a paving edge at a side of the machine to ensure desired placement of the mat.

In some applications, it may be desirable to have the ability to provide a console at both sides of the machine, and thus operate the machine while viewing a desired side of the machine. To accomplish this, some machines have been provided with multiple consoles, for example two consoles on opposite sides of the machine. To avoid the cost and complication involved with the provision of two consoles, machines have been provided with systems that allow the console to move between opposite sides of the machine. Thus, a single console may be used in multiple locations with respect to the machine.

Movable structures for changing the position of a console frequently involve complicated structures having multiple linkages and pivots. Thus, such structures may be difficult to manufacture, expensive, and prone to require routine maintenance. Such structures may also place important components in an exposed location where they may be crimped, snagged, or otherwise damaged or interfere with proper operation.

An exemplary road finishing machine with a mobile control panel is disclosed in U.S. Pat. No. 9,156,498 ("the '498 patent") to Herzberg. The mobile control panel disclosed in the '498 patent is shiftable in a width direction by the operation of thrust bearings. The thrust bearings rotate about vertical axes, and are loaded in an axial direction of the thrust bearings. While the mobile control panel of the '498 patent may be useful in some situations, the thrust bearings used to shift the mobile control panel may be unable to withstand significant radial forces that may be introduced by acceleration, deceleration, and/or vibration of the machine. Thus, the mobile control panel of the '498 patent may require frequent maintenance, and even possibly fail.

The disclosed machine console system may solve one or more of the problems set forth above and/or other problems in the art. The scope of the current disclosure, however, is defined by the attached claims, and not by the ability to solve any specific problem.

SUMMARY

In one aspect, a steering console system for a machine may include a longitudinally-extending rail configured to be fastened to a surface of the machine, the rail including a pair of convex-shaped edges, a steering console, and a console carriage slidably connected to the rail, the console carriage including a bracket, a plurality of rollers connected to the bracket, a support arm connected to the bracket to support the steering console, and a vertical pivot connected to the bracket and to the support arm. Each of the rollers may have a concave groove configured to roll along the convex shaped edges, and each of the rollers may be configured to rotate about an axis of rotation extending approximately normal with respect to the rail.

In another aspect, a steering console system for a machine may include a longitudinally-extending rail configured to be fastened to a surface of the machine, the rail including a pair of convex-shaped edges, a steering console, and a console carriage slidably connected to the rail, the console carriage including a bracket, a plurality of rollers connected to the bracket, a support arm connected to the bracket to support the steering console, and a cam mechanism configured to move a first roller of the rollers in an arc-shaped path. Each of the rollers may have a concave groove configured to roll along the convex shaped edges.

In another aspect, a steering console system provided in an operator station of a machine may include a longitudinally-extending rail fastened to a surface of the machine in the operator station, the rail including a pair of convex-shaped edges, a pocket provided in the surface of the machine, and a steering console. The steering console system may include a console carriage slidably connected to the rail, the console carriage including a bracket, a plurality of rollers connected to the bracket, a support arm pivotably connected to the bracket to support the steering console, a vertical pivot connected to the bracket and to the support arm, and a cam mechanism configured to move a first roller of the rollers in an arc-shaped path, each of the rollers has a concave groove configured to roll along the convex shaped edges, each of the rollers configured to rotate about an axis of rotation extending approximately normal with respect to the rail. The steering console system may include a cable guide connected to the console carriage, the cable guide being provided in the pocket.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
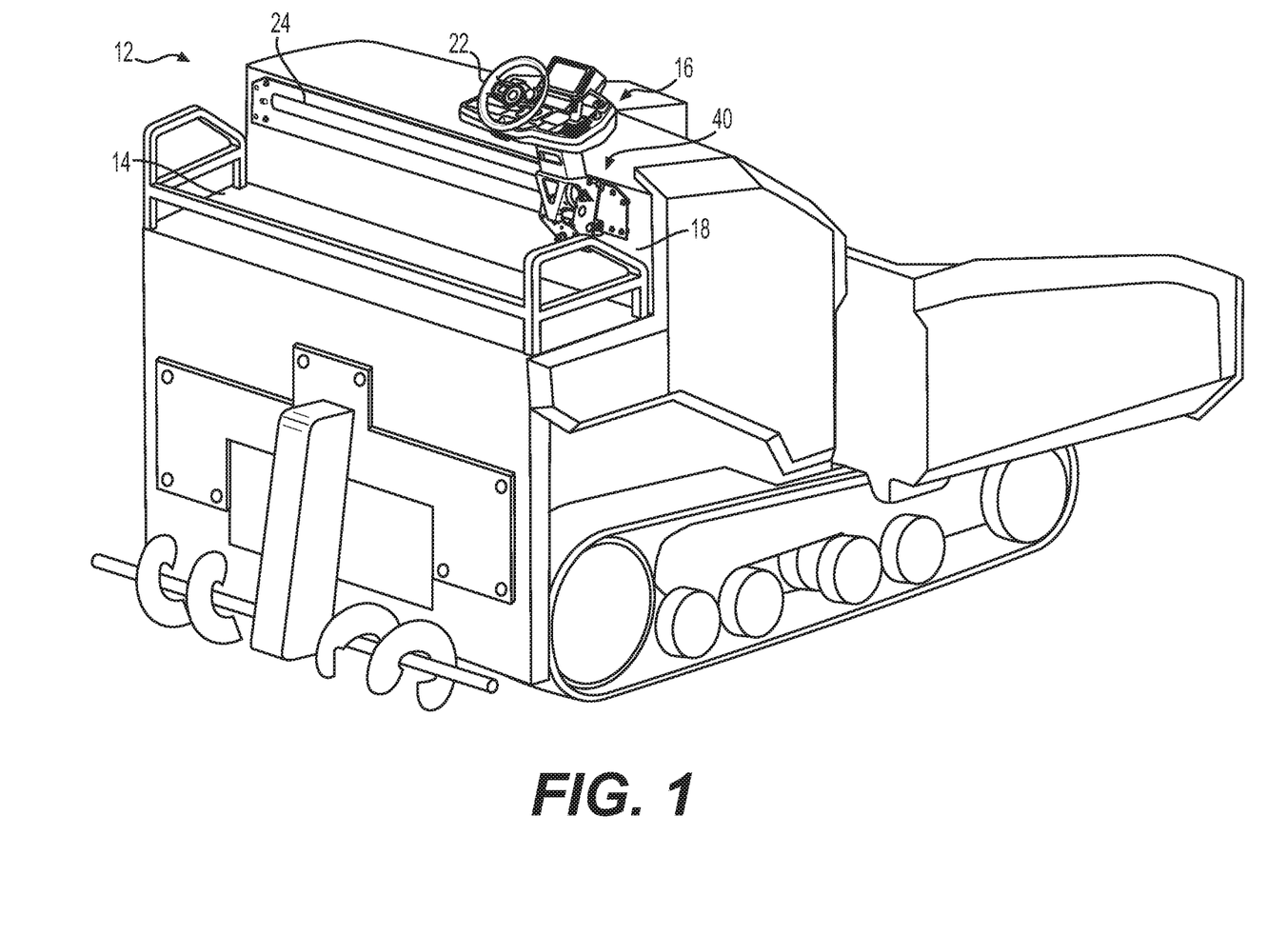
FIG. 1 is a partially schematic perspective view of a machine having a steering console system in an operator station according to aspects of the disclosure.

FIG. 1 provides a partially schematic illustration of portions of an exemplary machine 12 according to the present disclosure. Machine 12 may be a mobile industrial machine, such as a construction or earth moving machine. Machine 12 will be described below in the context of a paving machine, but the features disclosed may be used with any other type of industrial machine. Machine 12 may include an operator station 14, a steering console system 16 provided in the operator station 14, and a steering console 22 as part of the steering console system 16. One or more operator seats (not shown) may be provided within operator station 14. Console 22 may include one or more controls useful to operate machine 12, such as a steering wheel and/or joystick to maneuver or otherwise control aspects of the machine 12. As shown in the exemplary configuration of FIG. 1 steering console 22 may include a steering wheel, joystick, display, and other operator controls or interfaces. Console 22 may be connected to an approximately vertically-extending wall or machine surface 18 of the console system 16 by a console carriage 40 and a rail 24. Rail 24 may be a longitudinally or horizontally-extending rail fixedly secured to machine surface 18.

Figure 2:
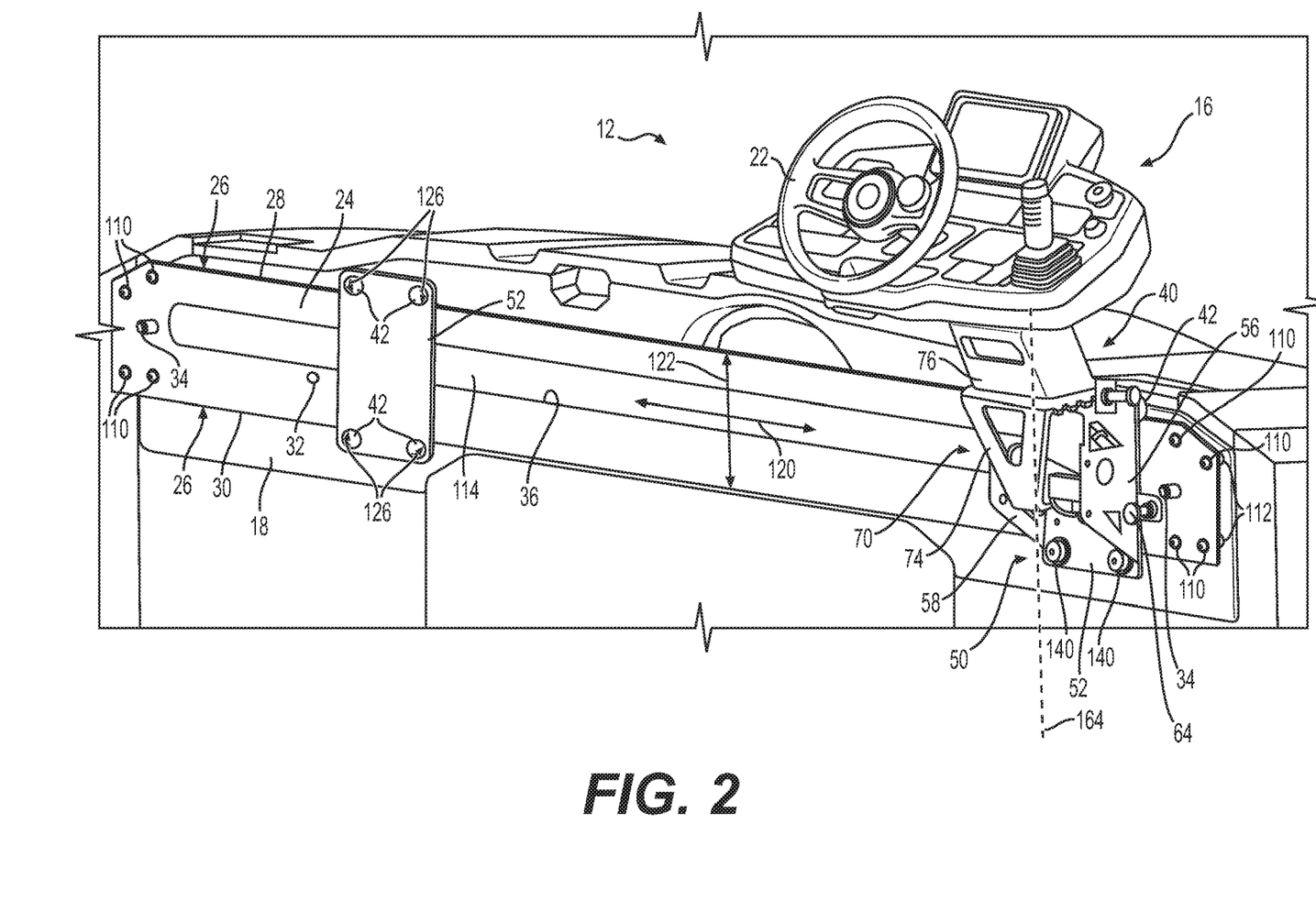
FIG. 2 is a perspective view showing the console system of FIG. 1.

FIG. 2 is a perspective view illustrating console system 16 and showing an exemplary steering console 22, carriage 40, and rail 24. Console carriage 40 may be slidable in a width or approximately horizontal direction 120 between a plurality of positions. In one aspect, these positions include at least two opposing sides of operator station 14 (FIG. 1) in the horizontal direction 120. Rail 24 may extend approximately along the horizontal direction 120 between these opposing sides of station 14, and may be mounted to machine surface 18 to support steering console 22 and carriage 40. Carriage 40 may include a bracket 50 slidably connected to rail 24 and a swivel system 70 to pivotably connect console 22 to bracket 50. Carriage 40 may form an assembly that is slidably connected to rail 24 by rollers 42. It is understood that rollers 42 roll along rail 24, as described below, to facilitate this slidable connection of carriage 40 to rail 24. Thus, while the carriage 40 is described as being "slidable" along rail 24, it can equally be characterized as "rolling" along rail 24. Swivel system 70 may be configured to allow the console 22 to be pivotable about an axis 164 approximately parallel to a vertical direction 122.

Figure 6:
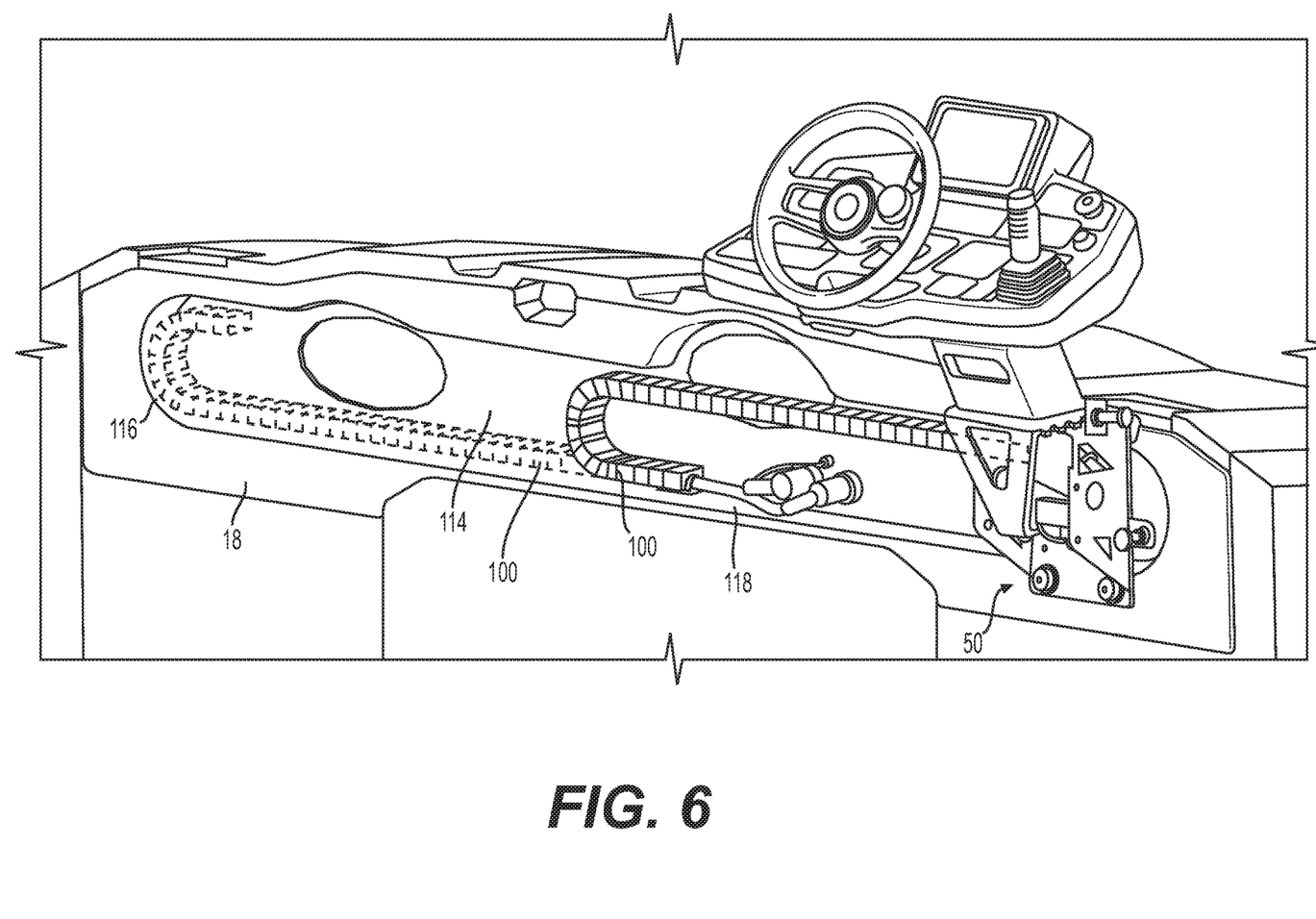
FIG. 6 is a perspective view showing a cable guide of the console system.

In one aspect, rail 24 may be mounted to machine surface 18 via a plurality of rail fasteners 110, such as bolts. Each rail fastener 110 may extend through a rail spacer 112 provided between rail 24 and surface 18 to offset rail 24 from surface 18. Surface 18 may include a pocket or recess 114 behind rail 24 to accept a cable guide 100 for connecting wiring to console 22 (FIG. 6). Rail 24 may include a slot 36 formed as a through-hole behind bracket 50 that receives cables via cable guide 100 (FIG. 6).

Figure 3:
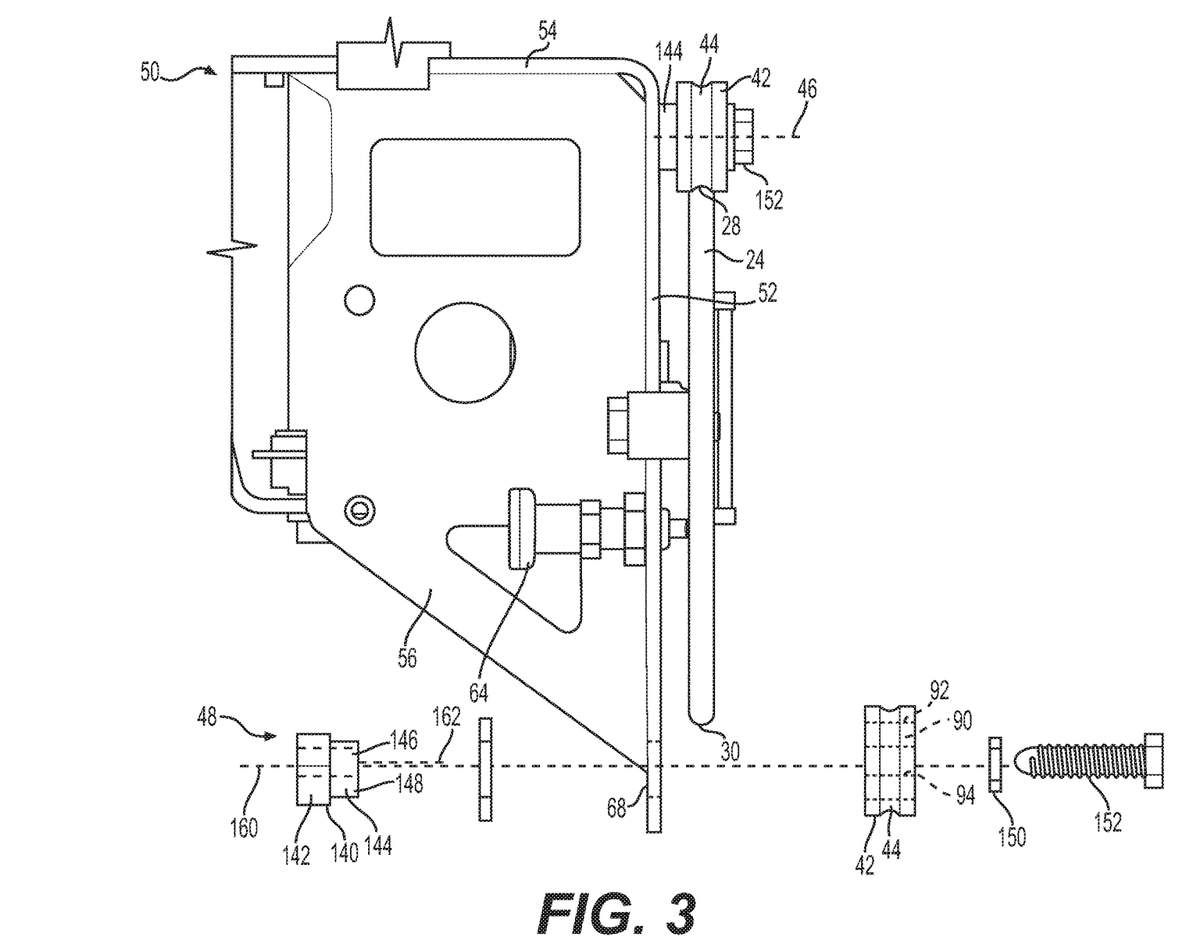
FIG. 3 is a partially-exploded side view showing a carriage and a cam mechanism of the console system.

At upper and lower ends thereof, rail 24 may include a pair of convex-shaped edges 26 that extend along the longitudinal direction of rail 24 approximately parallel to horizontal direction 120. Convex-shaped edges 26 may include an upper edge 28 and a lower edge 30 provided on an opposite end of rail 24 in the approximately vertical (height) direction 122. Convex-shaped edges 26 may each have a profile corresponding to a segment (arc) of a circle, as best shown in FIG. 3.

Referring back to FIG. 2, opposite ends of rail 24 may include stop protrusions 34 for limiting the sliding of the carriage between ends of the rail 24. One or more stop detent or holes 32 (one shown in FIG. 2) may also be provided within rail 24, with each stop detent 32 corresponding to a predetermined securing position of carriage 40 along the length of the rail 24. While two stop detents 32 may be provided, each at opposite end portions of rail 24, any number of stop detents 32 may be formed in rail 24 to provide additional predetermined position(s) for carriage 40 and steering console 22. In the exemplary configuration shown in FIG. 2, a releasable lock pin 64 may secure carriage 40 within a stop detent 32.

Bracket 50 may have a rear plate 52, as shown in FIG. 2, and an upper plate 54 (FIGS. 3 and 5), and a pair of side plates 56, 58. Each side plate 56, 58 may extend from opposite side portions of rear plate 52. A plurality of rollers 42 (one shown in the right portion of FIG. 2) may be mounted to rear plate 52. For example, rollers 42 may be mounted to upper and lower portions of rear plate 52 by roller fasteners 140. Each of the rollers 42 may be disposed on a rear side of rear plate 52, while each fastener 140 extends outward to a front side of rear plate 52. Fasteners 140 may secure each roller to rear plate 52 in a manner that allows each roller to roll on one of upper edge 28 or lower edge 30.

A left portion of FIG. 2 shows steering console system 16 in a second position, but with the console 22 and portions of console carriage 40 removed to better illustrate the arrangement of rollers 42 on rear plate 52. As can be seen, rear plate 52 may form a support structure for a plurality of rollers 42. In an exemplary configuration, four rollers may be provided on rear plate 52, a first pair provided on an upper portion of rear plate 52, and a second pair provided on a lower portion of rear plate 52, as shown in FIG. 2. However, more or less rollers 42 may be provided. At least one of the four rollers 42 may be translatable along a substantially arc-shaped path 126 by rotating a fastener 140 as described in greater detail below. This translation corresponds to a movement of the rotational axis of the roller 42 along the arc-shaped path 126. The depiction of each arc-shaped path 126 is exemplary, as each roller 42 may be adjusted in a clockwise direction or in a counterclockwise direction by rotating fastener 140 accordingly. While all four rollers 42 may be translatable or adjustable along arc-shaped path 126, in an exemplary configuration, only one, only two, or only three rollers may be translatable or adjustable. In one aspect, only the lower two rollers that abut lower edge 30 may be translatable or adjustable.

FIG. 3 is a partially-exploded side view of bracket 50 positioned on rail 24, showing rear plate 52, upper plate 54, and side plate 56. In an exemplary configuration, upper plate 54 may be formed as a unitary structure with rear plate 52. However, rear and upper plates 52, 54 may instead be separate plates that are welded together. As will be discussed in more detail in connection with FIG. 5, a pair of horizontally-extending upper and lower support plates 60, 62 (FIG. 5), may connect side plates 56 and 58 to each other, and provide a support for swivel system 70.

Figure 5:
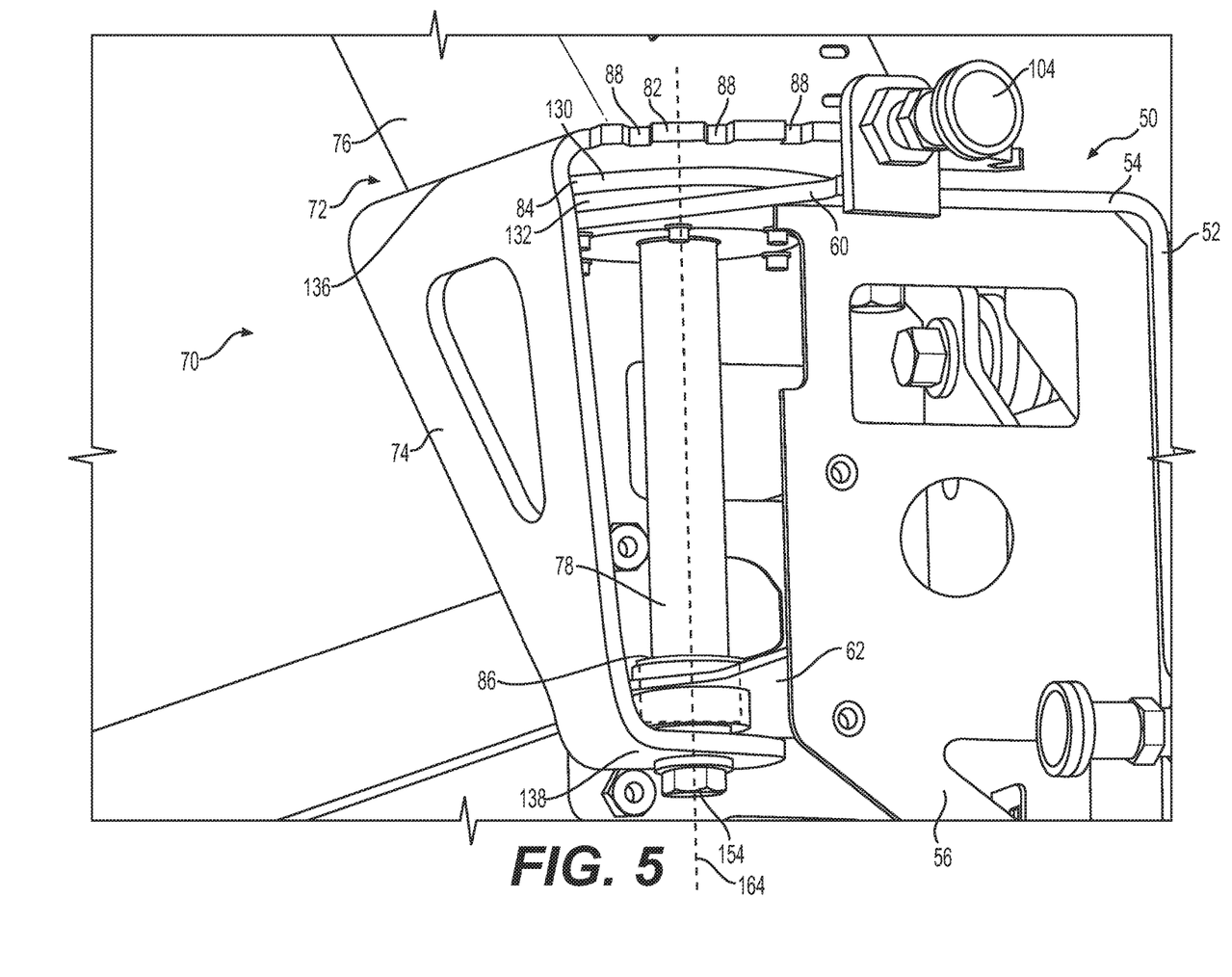
FIG. 5 is a perspective view showing a bracket and swivel structure of the console system.

As shown in FIG. 3, rear plate 52 may define a front side of bracket 50 that may face toward operator station 14, and a rear side that may face recess 114 (FIG. 6). The front side of bracket 50 may include a head portion of fastener 140, upper plate 54, side plates 56, 58, and swivel system 70, including vertical pivot 72 and vertical pivot axis 164 (FIGS. 2 and 5). Lock pin 64 may also be supported on the front side of rear plate 52. Rear plate 52 may define the rear side of bracket 50 such that this rear side includes rail 24 and rollers 42.

Each of the rollers 42 may include a concave groove 44 formed along an outer circumference of the roller. This concave groove 44 may be formed with a surface that closely mates with upper edge 28 or lower edge 30 of rail 24. Each roller 42 may be rollable along one of upper edge 28 or lower edge 30 about centrally-disposed roller axis 46. Roller axis 46 may extend approximately normal with respect to rail 24. Roller axis 46 may also extend approximately normal to horizontal direction 120 and vertical direction 122. Each roller 42 may define a roller axis 46 such that none of the roller axes 46 overlap each other. In one aspect, the roller axes 46 extend approximately parallel to each other.

With reference to the exploded view provided at the lower portion of FIG. 3, each roller 42 may include an integrated roller bearing 90 (represented by dashed lines in FIG. 3). Roller bearing 90 may be configured to withstand significant radial forces such that a small number of roller bearings (e.g., four) are configured to support the weight of console 22 and carriage 40. Each roller bearing 90 may include an outer race 92 that rotates as a unit with the outer circumference of roller 42, including concave groove 44. An inner race 94 of each roller may be rotatable relative to the outer race 92 and the outer circumference of roller 42. Inner race 94 may remain approximately still during a sliding motion of carriage 40. A through-hole extending through front and rear sides of roller bearing 90 may be defined by an inner circumferential surface of inner race 94.

Figure 4:
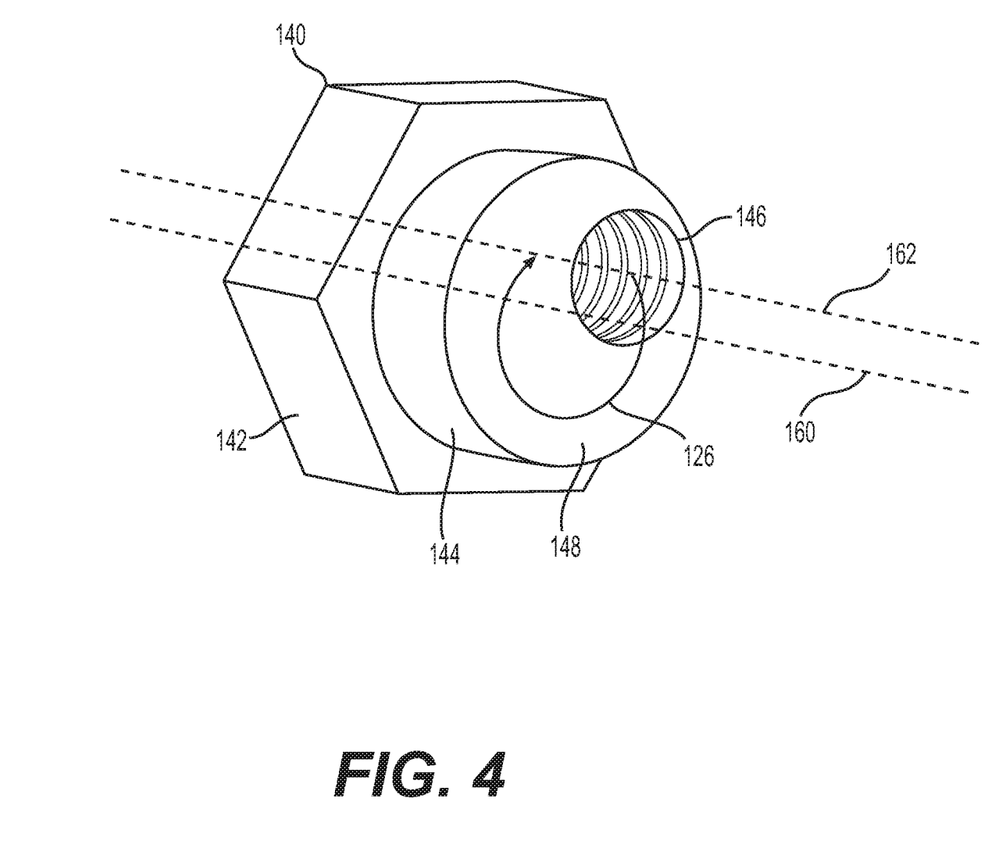
FIG. 4 is a perspective view illustrating an exemplary roller fastener of the console system.

With continued reference to the exploded view in the lower portion of FIG. 3, a cam assembly or mechanism 48 may be provided for mounting each roller 42 to rear plate 52. Cam mechanism 48 may include an offset fastener 140, one or more washers 150, and a threaded bolt 152. Offset fastener 140 may have a polygonal-shaped (e.g., hexagonal) head 142 from which an axial protrusion 144 extends. Protrusion 144 may be have an approximately cylindrical shape symmetrically disposed with respect to head 142. An internally-threaded hole 146 may extend within protrusion 144. As best shown in FIG. 4, hole 146 may be offset with respect to protrusion 144 and head 142, in that a central axis 162 of hole 146 may be offset from a central axis 160 of protrusion 144 and head 142. Offset hole 146 may extend entirely through head 142 and protrusion 144 of fastener 140, or may only extend into the protrusion 144.

Cam assembly 48 may include a through-hole 68 provided in rear plate 52 of bracket 50, the through-hole 68 being shaped to receive protrusion 144. Through-hole 68 may have generally the same size/shape as protrusion 144 to allow insertion of protrusion 144 therein without significant clearance. Threaded bolt 152 may be received through a rear side of roller bearing 90, washers 150, and offset fastener 140, such that a central, rotating axis of roller 42 may be provided at a position offset from a center axis 160 of head 142 and protrusion 144 of fastener 140. In one aspect, threaded bolt 152 may bring roller 42 into alignment with a center axis 162 (FIG. 4) of threaded hole 146. An end face 148 of protrusion 144 may remain outside of roller 42 when the components of cam assembly 48 are secured to rear plate 52. For example, end face 148 may abut roller 42 and protrusion 144. However, one or more washers 150 may be additionally provided between rear plate 52 and roller 42.

FIG. 4 is a perspective view of offset fastener 140 of cam assembly 48. As can be seen in FIG. 4, internally-threaded hole 146 may extend from a surface formed by end face 148 of protrusion 144. The internally-threaded hole 146 may define axis 162 at a position offset from center axis 160 of fastener 140. In one aspect, center axis 160 forms a rotational axis of offset fastener 140. Center axis 160 may extend centrally with respect to both head 142 and protrusion 144 of fastener 140. Thus, arc-shaped paths 126 (FIG. 2) may be formed by a path of the axis 162 of threaded hole 146 as this axis 162 orbits about center axis 160.

FIG. 5 illustrates a perspective view of swivel system 70 for pivoting vertical pivot 72 about an approximately vertical pivot axis 164. Vertical pivot 72 may include C-shaped bracket 74 and support arm 76. Support arm 76 may form an upper portion of vertical pivot 72, while C-shaped bracket 74 may form a lower portion of vertical pivot 72. C-shaped bracket 74 may extend from a first or upper end 136 to a second or lower end 138. As can be seen in FIG. 5, C-shaped bracket 74 may overlap vertical pivot axis 164, for example by ends 136 and 138. A swivel bearing 84 may be provided at upper end 136, while a bushing 86 may be provided at lower end 138. Swivel system 70 may be pivotable by swivel bearing 84, while support bar 78 transmits bending load from the C-shaped bracket 74 to lower end 138 via bushing 86.

Support bar 78, swivel bearing 84, and bushing 86 may together provide support for console 22 (not shown in FIG. 5) on bracket 50. Support bar 78 may extend between the upper and lower ends 136, 138 of C-shaped bracket 74. A threaded bolt 154 may extend through lower end 138 to be received by an interior of support bar 78. C-shaped bracket 74 may be supported by upper support plate 60 and a lower support plate 62 of bracket 50. Upper and lower support plates 60, 62 may extend from one or both of side plates 56 and 58. As shown in FIG. 5, upper support plate 60 may be the same as upper plate 54 of bracket 50, or extend therefrom.

With continued reference to FIG. 5, swivel bearing 84 may be interposed between an upper end 136 (of C-shaped bracket 74) and upper support plate 60 (of bracket 50). Swivel bearing 84 may include a plurality of plates that are rotatable with respect to each other. A first, or upper plate 130 of swivel bearing 84 may be fixedly connected to upper end 136. Upper plate 130 may rotate about vertical pivot axis 164 with the components of vertical pivot 72, including C-shaped bracket 74. Support bar 78 may rotate with vertical pivot 72. A lower plate 132 of swivel bearing 84 may remain fixed during this rotation, and may be fastened to upper arm 60, as shown in FIG. 5.

Upper end 136 of C-shaped bracket 74 may also include an approximately arc-shaped locking plate 82 having a plurality of detents 88 formed therein. Each detent 88 may correspond to a predetermined respective rotational position of console 22 and vertical pivot 72 with respect to vertical pivot axis 164. A lock pin 104 for selectively locking swivel system 70 against rotational motion may be secured to upper plate 54, as shown in FIG. 5. Lock pin 104 may be spring biased and positioned such that a head of lock pin 104 is automatically positionable within each detent 88 of locking plate 82 to secure the rotational position of console 22.

At the lower end 138 of C-shaped bracket 74, bushing 86 may be interposed between lower support plate 62 and support bar 78. Bushing 86 may be formed as an approximately cylindrical sleeve, as represented by the dashed lines in FIG. 5. Bushing 86 may be received in a cylindrically-shaped receptacle fixed to lower support plate 62. A lower portion of support bar 78 may extend through this cylindrically-shaped receptacle to lower end 138. In one aspect, bushing 86 is a non-metallic material. In one aspect, bushing 86 may be formed of a self-lubricating non-metallic material. Thus, as can be seen in FIG. 5, only one swivel bearing 84 is necessary in swivel system 70 (i.e., no second swivel bearing is necessary).

FIG. 6 is a perspective view according to the view of FIG. 2 with rail 24 removed. As can be seen in FIG. 6, the recess 114 may be an approximately stadium-shaped cavity formed within surface 18. A cable guide 100 may extend behind rear plate 52. Recess 114 may include a curved side wall 116 and a floor 118 configured to support cable guide 100. This support prevents cable guide 100 from extending below carriage 40, or exiting recess 114. The cable guide 100 may be fixedly secured to a rear side of rear plate 52. Rear plate 52 may include one or more through-holes or slots through which individual cables or a cable harness may extend to connect individual cables to console 22.

INDUSTRIAL APPLICABILITY

The disclosed aspects of machine 12 and steering console system 16 may be used to position a console 22 in multiple horizontal locations as well as multiple rotational positions within operator station 14. In one aspect, both a horizontal position and a rotational position (with respect to a vertical axis) may be adjusted in a straight-forward manner by releasing a lock pin and performing an adjustment. Additionally, carriage 40 may be secured, and suitably tightened, to rail 24 with a cam assembly 48. Rotational positioning of steering console system 16 may be performed without the need for a plurality of swivel bearings, while an upper swivel bearing does not experience excess deflection or load. Additionally, a cable guide 100 may be provided behind carriage 40 in a manner that prevents the cable guide 100 from entering an operator area of an operator station.

With reference to FIG. 2, the steering console system 16 may facilitate positioning of steering console 22 along an approximately horizontal direction 120. To modify a position of console 22 in horizontal direction 120, lock pin 64 may be pulled in a direction toward an interior of operator station 14, removing a head of lock pin 64 from stop detent 32. Then, console 22 and carriage 40 may be urged to slide together as a unit along rail 24 due to a rolling motion of rollers 42 along convex-shaped edges 26.

Turning to FIG. 3, during this sliding motion of console 22 and carriage 40, the outer circumferential surface of each roller 42, including concave groove 44, may rotate together with an outer race of roller bearing 90 disposed therein. Fastener 140 may remain in an approximately constant circumferential position (i.e., does not rotate) during the sliding of console and carriage 40. Similarly, inner race 94 of roller bearing 90, which may have a non-threaded internal surface, may also remain in an approximately constant circumferential position, and is secured between end face 148 and washer 150 (or between a pair of washers) which contact side surfaces of inner race 94. Once carriage 40 has been placed in a desired location, which may include a detent 32 within rail 24, a head of lock pin 64 may be inserted into the corresponding detent 32. In one aspect, lock pin 64 may be biased (e.g. spring biased) towards a position in which the head of the lock pin 64 remains within detent 32. The sliding process may be performed as desired to place console 22 at a plurality of different horizontal positions.

During the sliding motion of carriage 40, cable guide 100 may articulate within recess 114, as shown in FIG. 6. An end of cable guide 100 may be connected to bracket 50 and extend through slot 36. Thus, cable guide 100 may move together with bracket 50 and the other components of console system 16. For example, when console system 16 is translated along horizontal direction 120 from the position at the right side of FIG. 6 to a position at the left side of FIG. 6, cable guide 100 may similarly move from the position shown in the right side of FIG. 6 to the position shown in dashed lines at the left side of FIG. 6. At the position on the left side of recess 114, recess side wall 116 may form a curved surface configured to receive, guide, and maintain cable guide 100 in a vertically planar configuration.

Throughout the sliding motion of console 22, cable guide 100 may be guided and supported by recess floor 118. As shown in FIG. 6, cable guide 100 may remain within an approximately vertical plane within recess 114, regardless of the sliding motion of console 22. Additionally, cable guide 100 may remain behind rear plate 52 and rail 24. Thus, cable guide 100 may be confined within a space behind rail 24 outside of a portion of operator station 14 in which an operator may be present.

As shown in FIG. 2 and described previously, each roller 42 may be translated along an approximately arc-shaped path 126 to tighten or loosen a roller 42 with respect to one of the convex-shaped edges 26. By moving each roller 42 along path 126, an amount of force applied to the edge by concave groove 44 may be increased or decreased. Turning to FIG. 3, head 142 of fastener 140 may be rotated (e.g., by a wrench), causing fastener 140 to rotate within through-hole 68 provided in rear plate 52 and symmetrically about central axis 160 of head 142 and protrusion 144. Offset threaded hole 146, which is radially spaced from central axis 160, moves in an arc-shaped path 126 so as to orbit about central axis 160. Bolt 152, which is aligned with offset hole 146 together with roller 42, may also move so as to orbit central axis 160. Thus, each roller 42 may be adjusted toward, or away from, a corresponding convex-shaped edge 26.

As shown in FIG. 5, swivel system 70 may facilitate pivoting motion of console 22 about an approximately vertical pivot axis 164. To modify a rotational position of console 22 about pivot axis 164, lock pin 104 may be pulled in a direction away from arc-shaped locking plate 82, so as to withdraw a head of lock pin 104 from a detent 88. Then, console 22 may be rotated about vertical pivot axis 164. During this rotation, vertical pivot 72 (including C-shaped bracket 74 and support arm 76) and support bar 78, may rotate as a unit about pivot axis 164. Upper plate 130 of swivel bearing 84 may also rotate, while lower plate 132 and bushing 86 remain at approximately constant rotational positions. Once swivel system 70 brings console 22 to a desired rotational position, a head of lock pin 104 may be inserted into the corresponding detent 88 of locking plate 82. In one aspect, lock pin 104 may be biased toward a position in which the head of lock pin 88 remains within detent 88.

The steering console system 16 may employ rollers 42 having a circular or concave profile. The rollers may be capable of accepting radial loads, in contrast to systems that employ thrust bearings, for example, that may not tolerate significant radial loads. A proper torque may be employed by rotating head 142, thereby moving a roller into firmer contact with the corresponding edge 28, 30, which may reduce any looseness or shakiness between the components of system 16. Roller positions may be maintained by tightening threaded bolt 152 while holding head 142 in a constant position. This tightening may be performed when assembling system 16 or after extended operation of machine 12 in the event that looseness begins to be experienced.

The system 16 may also provide a swivel system having the ability to swivel while transmitting bending load in a manner that may prevent excess deflection. The steering console system 16 may also reduce load placed on a swivel bearing. Additionally, the steering console system 16 may reduce cost and complexity by avoiding the need to provide more than one swivel bearing.

It will be apparent to those skilled in the art that various modifications and variations can be made to the disclosed machine console system without departing from the scope of the disclosure. Other embodiments of the machine console system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A steering console system for a machine, comprising:
    a longitudinally-extending rail configured to be fastened to a surface of the machine, the rail including a pair of convex-shaped edges;
    a steering console;
    a console carriage slidably connected to the rail, the console carriage including a bracket, a plurality of rollers mounted on a rear plate of the bracket, a support arm connected to the bracket to support the steering console, and a vertical pivot connected to the bracket and to the support arm; and
    a lock pin supported by the rear plate,
    wherein each of the rollers have a concave groove configured to roll along the convex shaped edges, and each of the rollers are configured to rotate about an axis of rotation extending approximately normal with respect to the rail.

2. The steering console system of claim 1, wherein the rail extends generally horizontally, and the pair of convex-shaped edges include an upper edge and a lower edge.

3. The steering console system of claim 1, wherein the bracket includes a pair of side plates extending from opposite sides of the rear plate.

4. The steering console system of claim 1, wherein the rollers are disposed on a rear side of the bracket, and the vertical pivot is disposed on a front side of the bracket.

5. The steering console system of claim 1, wherein the console carriage includes a swivel system that includes a generally vertical pivot axis.

6. The steering console system of claim 5, wherein the swivel system includes a C-shaped bracket that overlaps the vertical pivot axis.

7. The steering console system of claim 6, wherein the swivel system includes a swivel bearing provided at a first end of the C-shaped bracket.

8. The steering console system of claim 7, wherein the swivel system includes a bushing at a second end of the C-shaped bracket.

9. The steering console system of claim 6, wherein the C-shaped bracket includes an approximately arc-shaped lock plate in which a plurality of locking detents are formed, each of the locking detents corresponding to a different position of the vertical pivot with respect to the pivot axis.

10. A steering console system for a machine, comprising:
    a longitudinally-extending rail configured to be fastened to a surface of the machine, the rail including a pair of convex-shaped edges;
    a steering console; and
    a console carriage slidably connected to the rail, the console carriage including a slidable bracket, a plurality of rollers connected to the slidable bracket, a rotatable bracket, a support arm connected to the slidable bracket to support the steering console, the support arm extending above the rotatable bracket and below the steering console such that a pivot axis about which the rotatable bracket rotates extends through the support arm, and a cam mechanism configured to move a first roller of the rollers in an arc-shaped path,
    wherein each of the rollers has a concave groove configured to roll along the convex shaped edges.

11. The steering console system of claim 10, wherein the cam mechanism includes a fastener on which the first roller is supported.

12. The steering console system of claim 11, wherein the fastener includes a through-hole that is offset from an axis of rotation of the fastener.

13. The steering console system of claim 12, further including a bolt extending through the first roller and through the through-hole of the fastener.

14. The steering console system of claim 11, wherein the rollers are disposed on a rear side of the slidable bracket, and the fastener extends to a front side of the slidable bracket.

15. The steering console system of claim 14, wherein the fastener includes an axial protrusion aligned with an axis of rotation of the fastener.

16. The steering console system of claim 10, wherein the rotatable bracket includes an arc-shaped portion that defines a plurality of rotational positions of the steering console.

17. The steering console system of claim 10, wherein the rotatable bracket includes an upper end and a lower end, and only the upper end contacts the support arm.

18. A steering console system provided in an operator station of a machine, comprising:
    a longitudinally-extending rail fastened to a surface of the machine in the operator station, the rail including a pair of convex-shaped edges;
    a pocket provided in the surface of the machine;
    a steering console;
    a console carriage slidably connected to the rail, the console carriage including a bracket, a plurality of rollers connected to the bracket, a support arm pivotably connected to the bracket to support the steering console, a vertical pivot connected to the bracket and to the support arm and including a generally vertical pivot axis and a C-shaped bracket that overlaps the generally vertical pivot axis, and a cam mechanism configured to move a first roller of the rollers in an arc-shaped path, each of the rollers has a concave groove configured to roll along the convex shaped edges, each of the rollers configured to rotate about an axis of rotation extending approximately normal with respect to the rail; and
    a cable guide connected to the console carriage, the cable guide being provided in the pocket.

19. The steering console system of claim 18, wherein the console carriage includes a swivel bearing at a first end of the C-shaped bracket and a bushing at a second end of the C-shaped bracket.

20. The steering console system of claim 19, wherein the rollers are disposed on a rear side of the bracket, and the vertical pivot is disposed on a front side of the bracket.

* * * * *